(12) United States Patent
Akiyama (10) Patent No.: US 7,354,162 B2
(45) Date of Patent: Apr. 8, 2008

(54) PROJECTOR

(75) Inventor: Koichi Akiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 259 days.

(21) Appl. No.: 11/265,170

(22) Filed: Nov. 3, 2005

(65) Prior Publication Data

US 2006/0126026 A1 Jun. 15, 2006

(30) Foreign Application Priority Data

Dec. 9, 2004 (JP) ............................. 2004-356416

(51) Int. Cl.
| | |
|---|---|
| G03B 21/20 | (2006.01) |
| G03B 21/26 | (2006.01) |
| G03B 21/28 | (2006.01) |
| G02F 1/1335 | (2006.01) |
| H04N 5/74 | (2006.01) |
| G02B 5/30 | (2006.01) |
| G02B 27/10 | (2006.01) |
| G02B 27/12 | (2006.01) |
| G02B 27/14 | (2006.01) |
| G02B 27/28 | (2006.01) |

(52) U.S. Cl. ........................... 353/102; 353/20; 353/31; 353/34; 353/38; 353/82; 353/84; 353/99; 348/750; 348/757; 348/758; 349/9; 359/495; 359/497; 359/623; 359/634; 359/639

(58) Field of Classification Search ................ 353/102, 353/31, 33, 34, 37, 38, 81, 82, 84, 98, 99, 353/20; 348/739, 742, 744, 750, 757, 758; 349/5, 7, 8, 9; 359/618–623, 629, 633, 634, 359/638–640, 483, 494, 495, 497, 501

See application file for complete search history.

(56) References Cited

U.S. PATENT DOCUMENTS 5,689,315 A * 11/1997 Fushimi et al. ................ 349/5

(Continued)

FOREIGN PATENT DOCUMENTS

CN A 1480765 3/2004

(Continued)

Primary Examiner—Rochelle Blackman
(74) Attorney, Agent, or Firm—Oliff & Berridge, PLC (57) ABSTRACT

A projector includes: a light source device that emits substantially parallel illumination light; a first lens array having a plurality of first small lenses each of which divides the illumination light coming from the light source device into a plurality of partial light fluxes; a second lens array having a plurality of second small lenses corresponding to the first small lenses; a superposing optical system that superposes the partial light fluxes coming from the second lens array on regions to be illuminated; a color-separating and guiding optical system that separates the lights coming from the second lens array into lights in a plurality of different colors and guides the separated lights to the regions to be illuminated; a plurality of electro-optical modulation devices each of which modulates the light in the corresponding color of the lights in the plural colors separated by the color-separating and guiding optical system in accordance with image information; a color synthesizing optical system that synthesizes the lights in the respective colors modulated by the plural electro-optical modulation devices; and a projecting optical system that projects image light produced by the color synthesizing optical system. The superposing optical system has a first superposing lens disposed between the second lens array and the color-separating and guiding optical system and a second superposing lens having a convex lens included in the color-separating and guiding optical system.

12 Claims, 7 Drawing Sheets

U.S. PATENT DOCUMENTS

| | | |
|---|---|---|
| 6,910,773 B2 | 6/2005 | Nakashima et al. |
| 7,066,600 B2 | 6/2006 | Nakashima et al. |
| 2002/0176255 A1* | 11/2002 | Yamauchi et al. .......... 362/299 |
| 2004/0066492 A1 | 4/2004 | Nakashima et al. |
| 2004/0227910 A1 | 11/2004 | Akiyama et al. |
| 2005/0237489 A1 | 10/2005 | Nakashima et al. |

FOREIGN PATENT DOCUMENTS

| | | |
|---|---|---|
| JP | A 8-304739 | 11/1996 |
| JP | A 2001-337204 | 12/2001 |
| JP | A 2002-55208 | 2/2002 |

* cited by examiner

PROJECTOR

BACKGROUND

The exemplary embodiments relates to a projector.

Figure 7:
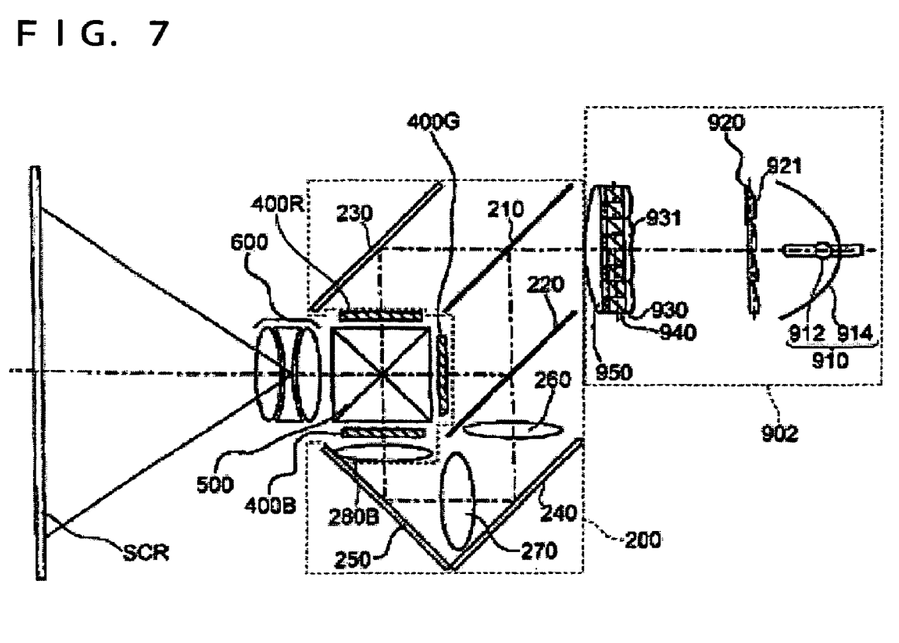
FIG. 7 is an explanatory diagram of a related-art projector 900.

FIG. 7 is an explanatory view of a related-art projector 900.

The related-art projector 900 includes: a lighting unit 902; a color-separating and guiding optical system 200 for separating light coming from the lighting unit 902 into lights in three different colors and guiding the respective lights to regions to be illuminated; three electro-optical modulation devices 400R, 400G and 400B for modulating the respective lights in the three colors separated by the color-separating and guiding optical system 200 in accordance with image information; a cross dichroic prism 500 for synthesizing the lights modulated by the thee electro-optical modulation devices 400R, 400G and 400B; and a projecting optical system 600 for projecting the light synthesized by the cross dichroic prism 500. The lighting unit 902 includes: a light source device 910 which has a parabolic reflector 914 and a light emission tube 912 disposed in the vicinity of the focus of the parabolic reflector 914 and emits illumination light; a first lens array 920 having a plurality of first small lenses 921 which divide the illumination light coming from the light source device 910 into a plurality of partial light fluxes; a second lens array 930 having a plurality of second small lenses 931 corresponding to the first small lenses 921; a polarization conversion element 940 for converting entering lights into one type linear polarized lights; and a superposing lens 950 for superposing the respective partial light fluxes coming from the polarization conversion element 940 on the regions to be illuminated (for example, see JP-A-8-304739, FIG. 11).

With the related-art projector 900, the lighting unit 902 is capable of converting light emitted from the light source device 910, which light has comparatively non-uniform in-plane light intensity distribution, into light having comparatively uniform in-plane light intensity distribution, and then supplying the converted light to the liquid crystal panels of the electro-optical modulation devices as the illumination targets by the operation of the first lens array 920, the second lens array 930, and the superposing lens 950.

In recent years, there is an increasing demand for using more compact electro-optical modulation devices for the cost reduction of the projector.

However, in the related-art projector 900, lowering of illumination efficiency and/or non-uniformity of luminance may be caused if the lighting unit 902 is made smaller in accordance with miniaturization of the electro-optical modulation devices. It is therefore impossible to drastically reduce the size of the lighting unit 902. Similarly, there is a limit to miniaturization of the color-separating and guiding optical system 200.

The size of the regions to be illuminated is determined by multiplying the size of the first small lenses 921 by a ratio $f_2/f_1$ (enlargement rate, $f_1$: focal length of the second small lenses 931, $f_2$: focal length of the superposing lens 950). It is difficult, however, to reduce the size of the first small lenses 921 without reducing the size of the lighting unit 902. It is also difficult to decrease the focal length $f_2$ of the superposing lens 950 without reducing the size of the color-separating and guiding optical system 200. Furthermore, it is not preferable to increase the focal length $f_1$ of the second small lenses 931 since the lighting unit 902 becomes larger accordingly. It is therefore not easy to reduce the size of the regions to be illuminated. In the result, it is not easy to employ the miniaturized electro-optical modulation devices.

This problem arises not only from the electro-optical modulation devices using the liquid crystal panels, but also from other electro-optical modulation devices.

SUMMARY

Aspects of the invention can provide a projector which uses miniaturized electro-optical modulation devices so as to reduce the cost of the projector.

A projector according to an exemplary embodiment may include: a light source device that emits substantially parallel illumination light; a first lens array having a plurality of first small lenses each of which divides the illumination light coming from the light source device into a plurality of partial light fluxes; a second lens array having a plurality of second small lenses corresponding to the first small lenses; a superposing optical system that superposes the partial light fluxes coming from the second lens array on regions to be illuminated; a color-separating and guiding optical system that separates the lights coming from the second lens array into lights in a plurality of different colors and guides the separated lights to the regions to be illuminated; a plurality of electro-optical modulation devices each of which modulates the light in the corresponding color of the lights in the plural colors separated by the color-separating and guiding optical system in accordance with image information; a color synthesizing optical system that synthesizes the lights in the respective colors modulated by the plural electro-optical modulation devices; and a projecting optical system that projects image light synthesized by the color synthesizing optical system. The superposing optical system has a first superposing lens disposed between the second lens array and the color-separating and guiding optical system and a second superposing lens having a convex lens included in the color-separating and guiding optical system.

In the projector according to an exemplary embodiment, since the second superposing lens having the convex lens is provided in the color-separating and guiding optical system, the focal length of the superposing optical system can be reduced while securing the length of the optical path of the color-separating and guiding optical system. Thus, the ratio of the focal length of the superposing optical system to the focal length of the second small lenses (i.e., the enlargement rate) can be decreased. As a result, the size of the regions to be illuminated can be reduced relative to the size of the first small lenses without miniaturizing the light source device and the color-separating and guiding optical system. Accordingly, the small-sized electro-optical modulation devices can be employed, and thus the cost of the projector can be easily reduced.

In the projector according to an exemplary embodiment, since the focal length of the superposing optical system is reduced as described above, the focal length of the second small lenses (and the first small lenses) can be decreased when electro-optical modulation devices smaller than the electro-optical modulation devices of the related-art projector are used as well as when electro-optical modulation devices of the same size as that of the electro-optical modulation devices of the related-art projector are used. Accordingly, the distance between the first lens array and the second lens array can be reduced, and thus the projector can be made compact.

In an exemplary embodiment the color-separating and guiding optical system can include a first dichroic mirror, a second dichroic mirror, first through third electro-optical modulation devices as the plural electro-optical modulation devices, and a first convex lens and a second convex lens as the second superposing lens. The first dichroic mirror can separate a first color light from second and third color lights in the light coming from the second lens array. The second dichroic mirror can separate the second color light from the third color light in the light coming from the first dichroic mirror. The first through third electro-optical modulation devices can modulate the respective first through third color lights. The first convex lens can be disposed between the first dichroic mirror and the second dichroic mirror. The second convex lens can be disposed between the first dichroic mirror and the first electro-optical modulation device.

In this structure, since relatively wide spaces are given to the first convex lens and the second convex lens, the color-separating and guiding optical system need not be large-sized. Accordingly, the focal length of the superposing optical system can be effectively reduced, and thus the enlargement rate can be decreased.

In an exemplary embodiment the focal length of the first convex lens can be equal to that of the second convex lens.

In this structure, since the same convex lens can be used as the first convex lens and the second convex lens, the manufacturing cost of the projector can be reduced.

In an exemplary embodiment the radius of curvature of either the first convex lens or the second convex lens disposed in an optical path along which a color light having a relatively long wavelength passes can be smaller than the radius of curvature of the other convex lens disposed in an optical path along which a color light having a relatively short wavelength passes.

Generally, a refractive index of a lens has a characteristic of wavelength dispersion, and the refractive index of light having a relatively longer wavelength is smaller than the refractive index of light having a relatively shorter wavelength. Thus, light having a relatively longer wavelength is more difficult to reflect than light having a relatively shorter wavelength. As a result, when the radii of curvature of the first and second convex lenses are set to the same value, the size of the region illuminated by the light having a relatively longer wavelength differs from the size of the region illuminated by the light having a relatively shorter wavelength. However, in the projector having this structure, the light having a relatively larger wavelength passes through the convex lens having a radius of curvature smaller than that of the convex lens through which the light having a relatively shorter wavelength passes so that the difficulty in reflection of the light having a relatively larger wavelength can be compensated. Thus, the size of the region illuminated by the light having a relatively longer wavelength becomes equal to the size of the region illuminated by the light having a relatively shorter wavelength. Accordingly, since the electro-optical modulation devices corresponding to the respective light colors obtain the illuminated regions of the same size, illumination conditions of the lights in the respective colors are equalized. As a result, unevenness of colors can be reduced and the color reproducibility can be enhanced.

Advantages of the above aspect of the invention can be offered especially when it is applied to a projector including a lens array unit having the first lens array and the second lens array formed as one-piece component as the first and second lens arrays.

The lens array unit having the one-piece first and second lens arrays is usually formed by press-molded glass. In this case, the thickness of the lens array unit increases when the distance between the first lens array and the second lens array is large. As a result, breaking or chipping may be caused during manufacture. Additionally, when the thickness of the lens array unit is large, the weight of the lens array unit increases and the material cost rises.

On the other hand, in the projector according to the above exemplary embodiment, since the focal length of the superposing optical system can be reduced, the focal length of the second small lenses (and the first small lenses) can be reduced when electro-optical modulation devices smaller than the electro-optical modulation devices of the related-art projector are used as well as when electro-optical modulation devices of the same size as that of the electro-optical modulation devices of the related-art projector are used. As a result, the distance between the first lens array and the second lens array can be decreased, and thus the thin lens array unit having the one-piece first and second lens arrays can be easily manufactured. Additionally, since the thin lens array unit is used in the projector, the weight of the lens array unit can be reduced and the material cost can be lowered while the projector is made compact. Furthermore, alignment of the first and second lens arrays is not required in positioning the respective optical components, and deterioration of the positional accuracy of the first and second lens arrays can be prevented.

Advantages of the above aspect of the invention can be also offered when it is applied to a projector including a lens array unit as the first and second lens arrays in which a light-transmissive member that guides the light coming from the first lens array to the second lens array is interposed between the first lens array and the second lens array and connects the first and second lens arrays.

In the lens array unit having the above structure, it is desired that the thickness of the light-transmissive member be decreased so as to reduce the weight of the lens array unit and the material cost and thus make the projector compact.

In the projector according to the above exemplary embodiment, the focal length of the superposing optical system is reduced as described above. As a result, the focal length of the second small lenses (and the first small lenses) can be decreased when electro-optical modulation devices smaller than the electro-optical modulation devices of the related-art projector are used as well as when electro-optical modulation devices of the same size as that of the electro-optical modulation devices of the related-art projector are used. Accordingly, the distance between the first lens array and the second lens array can be decreased, and thus the lens array unit having the thin light-transmissive member can be easily manufactured. Since the thin lens array unit is used in the projector, the weight of the lens array unit can be reduced and the material cost can be lowered while the projector can be made compact. When the first lens array and the second lens array aligned with each other in advance are connected to the light-transmissive member, positional adjustment of the lens array unit having the first and second lens arrays with respect to other optical components is only required. It is therefore possible to facilitate the positioning of the respective optical components including the lens array unit and prevent deterioration of the positional accuracy of the first and second lens arrays after disposition of the respective optical components.

In an exemplary embodiment a refractive index of the light-transmissive member can be substantially equal to those of the first and second lens arrays. Also, in an exemplary embodiment, a refractive index of adhesive for connecting the first lens array to the light-transmissive member and the light-transmissive member to the second lens array can be substantially equal to those of the first and second lens arrays.

In this structure, reflection of light and the like at the boundaries between the first lens array and the light-transmissive member and between the second lens array and the light-transmissive member can be further prevented. As a result, loss of light quantity due to such undesirable reflection and the like can be further reduced.

In an exemplary embodiment, a linear expansion coefficient of the light-transmissive member can be equal to those of the first and second lens arrays.

In this structure, thermal stress due to variations in temperature caused by the use of the projector is prevented. As a result, damage to the joints between the first lens array and the light-transmissive member and between the second lens array and the light-transmissive member can reduce or be eliminated.

In an exemplary embodiment, a base material by which the light-transmissive member is formed can be the same as those of the first and second lens arrays.

In an exemplary em, the light source device can include an ellipsoidal reflector, a light emission tube having a light emission center in the vicinity of a first focus of the ellipsoidal reflector, and a collimating lens for converting light reflected and converged by the ellipsoidal reflector into substantially parallel light.

In this structure, since the size of the collimated light which is emitted from the light source device is smaller than the size of the ellipsoidal reflector, the projector can be made compact.

In an exemplary embodiment, the light emission tube can have a reflector that reflects, which is emitted from the light emission tube toward the illumination target side, to the light emission tube.

In this structure, since the light emitted toward the illumination target side is reflected to the ellipsoidal reflector through the light emission tube, the ellipsoidal reflector need not be so sized as to cover the ends of the light emission tube on the illumination target side. Accordingly, the size of the ellipsoidal reflector can be reduced and thus the projector can be made compact.

In an exemplary embodiment, the polarization conversion element that converts the illumination light coming from the light source device into one type linear polarized light and emitting the converted light can be interposed between the second lens array and the first superposing lens.

The projector having this structure is especially applicable to a projector including electro-optical modulation devices which modulate polarized light, such as electro-optical modulation devices using liquid crystal panels.

BRIEF DESCRIPTION OF THE DRAWINGS

The exemplary embodiments will be described with reference to the accompanying drawings, wherein like numbers refer to like elements, and wherein.

DESCRIPTION OF EXEMPLARY EMBODIMENTS

A Projector according to the exemplary embodiments will be described hereinafter with reference to the drawings.

First Exemplary Embodiment

Figure 1:
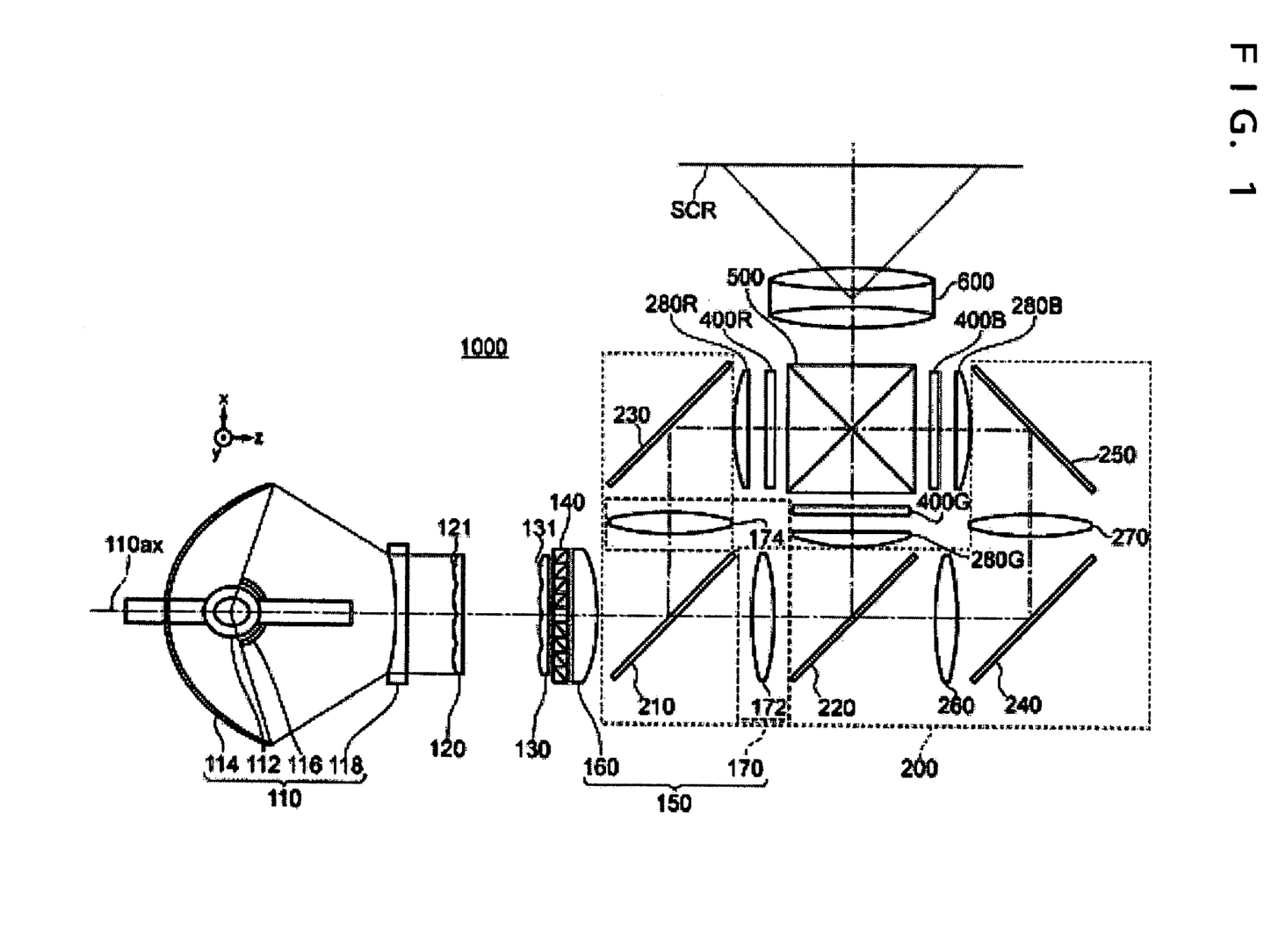
FIG. 1 is a diagram of an optical system of a projector 1000 according to a first exemplary embodiment.

FIG. 1 is a diagram of an optical system of a projector 1000 in a first exemplary embodiment. In the following description, three directions of a z-axis direction (light source optical axis 110ax direction in FIG. 1), an x-axis direction (direction parallel to the sheet surface of FIG. 1 and perpendicular to the z-axis), and a y-axis direction (direction perpendicular to the sheet surface of FIG. 1 and perpendicular to the z-axis) cross one another at right angles.

The projector 1000 in the first exemplary embodiment includes a light source device, a first lens array 120, a second lens array 130, a polarization conversion element 140, a superposing optical system 150, a color-separating and guiding optical system 200, three electro-optical modulation devices 400R, 400G and 400B, a cross dichroic prism 500 as a color-synthesizing optical system, and a projecting optical system 600. The light source device 110 emits substantially parallel illumination light. The first lens array 120 has a plurality of first small lenses 121 each of which divides the illumination light coming from the light source device 110 into a plurality of partial light fluxes. The second lens array 130 has a plurality of second small lenses 131 corresponding to the plural first small lenses 121. The polarization conversion element 140 converts the illumination lights coming from the light source device 110 into one type linear polarized lights and emitting the converted lights. The superposing optical system 150 has a first superposing lens 160 and a second superposing lens 170 for superposing the respective partial light fluxes coming from the polarization conversion element 140 on regions to be illuminated. The color-separating and guiding optical system 200 separates the lights coming from the first superposing lens 160 of the superposing optical system 150 into lights in three different colors and guiding the separated lights to the regions to be illuminated. The three electro-optical modulation devices 400R, 400G and 400B modulate the light in the corresponding color of the lights in the three colors separated by the color-separating and guiding optical system 200 in accordance with image information respectively. The cross dichroic prism 500 synthesizes the lights modulated by the electro-optical modulation devices 400R, 400G and 400B. The projecting optical system 600 projects the light synthesized by the cross dichroic prism 500 on a projection surface such as a screen SCR.

As shown in FIG. 1, the light source device 110 includes an ellipsoidal reflector 114, a light emission tube 112, a collimating lens 118 and an auxiliary mirror 116. The light emission tube 112 has a light emission center in the vicinity of a first focus of the ellipsoidal reflector 114. The collimating lens 118 converts the light reflected and converged by the ellipsoidal reflector 114 into substantially parallel light. The auxiliary mirror 116 is provided on the light emission tube 112 as reflecting means reflects light, which is emitted from the light emission tube 112 toward the illumination target side, to the light emission tube 112. The light reflected by the auxiliary mirror 116 emits from the light emission tube 112 to the ellipsoidal reflector 114 through the light emission tube 112.

The first lens array 120 is constituted by the first small lenses 121 each of which has a substantially rectangular contour as viewed from the z-axis direction and is arranged in a plane perpendicular to the z-axis. Each of the first small lenses 121 divides the light emitted from the light source device 110 into a plurality of partial light fluxes. The contour of the respective first small lenses 121 is so determined that the contour of the respective first small lenses 121 and that of the image forming regions of the electro-optical modulation devices 400R, 400G and 400B are similar. For example, when the aspect ratio (ratio of width to length) of the image forming regions of the electro-optical modulation devices 400R, 400G and 400B is 4:3, the aspect ratio of the respective first small lenses 121 is similarly set to 4:3.

The second lens array 130 has a substantially similar structure as that of the first lens array 120, and has the second small lenses 131 arranged in a plane perpendicular to the z-axis. The second lens array 130 forms the images emitted from the respective first small lenses 121 of the first lens array 120 on the electro-optical modulation devices 400R, 400G and 400B together with the superposing optical system 150.

The superposing optical system 150 includes the first superposing lens 160 and the second superposing lens 170. The first superposing lens 160 is interposed between the second lens array 130 and a first dichroic mirror 210 of the color-separating and guiding optical system 200. The second superposing lens 170 has a first convex lens 172 and a second convex lens 174 included in the color-separating and guiding optical system 200. The first convex lens 172 is interposed between the first dichroic mirror 210 and a second dichroic mirror 220. The second convex lens 174 is interposed between the first dichroic mirror 210 and the first electro-optical modulation device 400R (reflection mirror 230).

The color-separating and guiding optical system 200 separates the illumination lights emitted from the first superposing lens 160 into lights in three different colors of red as the first color, green as the second color, and blue as the third color, and guides the separated lights to the first through third electro-optical modulation devices 400R, 400G and 400B as illumination targets. The first dichroic mirror 210 reflects the red light and transmits the green and blue lights. The red light reflected by the first dichroic mirror 210 passes through the second convex lens 174. Then, the red light is further reflected by the reflection mirror 230, passes through a field lens 280R, and reaches and illuminates the first electro-optical modulation device 400R for red light.

The field lens 280R converges the plural partial light fluxes coming from the superposing optical system 150 such that the respective partial light fluxes can illuminate the electro-optical modulation device 400R for red light. The field lens 280R is disposed to convert individual partial light fluxes into light fluxes in substantially parallel with the respective principal rays. Other field lenses 280G and 280B disposed before the second and third electro-optical modulation devices 400G and 400B, respectively, have similar structures as that of the field lens 280R.

The green and blue lights pass through the first dichroic mirror 210, and then through the first convex lens 172. The green light having passed through the first convex lens 172 is reflected by the second dichroic mirror 220, passes through the field lens 280G, and reaches and illuminates the second electro-optical modulation device 400G for green light. The blue light having passed through the first convex lens 172 passes through the second dichroic mirror 220, a relay lens 260, an entrance-side reflection mirror 240, a relay lens 270, an exit-side reflection mirror 250, and the field lens 280B, and reaches and illuminates the third electro-optical modulation device 400B for blue light. Since the length of the optical path of the blue light is larger than those of lights in other colors, the lowering of the utilization efficiency of light due to divergence of light or for other reasons is prevented by disposing the relay lenses 260 and 270 and the reflection mirrors 240 and 250 for the blue light. That is, those lenses and mirrors are used so that the partial light fluxes having entered the relay lens 260 can be transmitted to the field lens 280B as they are. While the blue light of the lights in three colors passes through the relay lenses 260 and 270 and the reflection mirrors 240 and 250 in this embodiment, the lights in other colors such as the red light may pass through these lenses and mirrors.

The first through third electro-optical modulation devices 400R, 400G and 400B modulate entering illumination light in accordance with image information, and are the illumination targets for the light source device 110. Though not shown in the figures, an entrance-side polarization plate is interposed between the color-separating and guiding optical system 200 and each of the electro-optical modulation devices 400R, 400G and 400B, and an exit-side polarization plate is interposed between each of the electro-optical modulation devices 400R, 400G and 400B and the cross dichroic prism 500. The entering lights in the respective colors are modulated by the entrance-side polarization plates, the electro-optical modulation devices 400R, 400G and 400B, and the exit-side polarization plates. The first through third electro-optical modulation devices 400R, 400G and 400B have liquid crystals sealed between a pair of light-transmissive glass substrates. The electro-optical modulation devices 400R, 400G and 400B modulate the polarization direction of the one type linear polarized lights emitted from the entrance-side polarization plates in accordance with given image information using polysilicone TFT as a switching element.

The cross dichroic prism 500 is an optical element which produces a color image by synthesizing optical images formed by the lights in respective colors each of which is emitted from the exit-side polarizing plate and modulated. The cross dichroic prism 500 is a substantially square-shaped component in the plan view formed by combining four rectangular prisms, and dielectric multilayer films are provided on the substantially X-shaped boundaries between the adjoining rectangular prisms. The dielectric multilayer film formed on one of the substantially X-shaped boundaries reflects the red light, and the dielectric multilayer film formed on the other boundary reflects the blue light. As a result, the red and blue lights reflected by the dielectric multilayer films are made to advance in the same direction as that of the green light, allowing the lights in three colors to be synthesized.

The color image emitted from the cross dichroic prism 500 is enlarged and projected by the projecting optical system 600 so that the enlarged image can be projected on the screen SCR.

Figure 2:
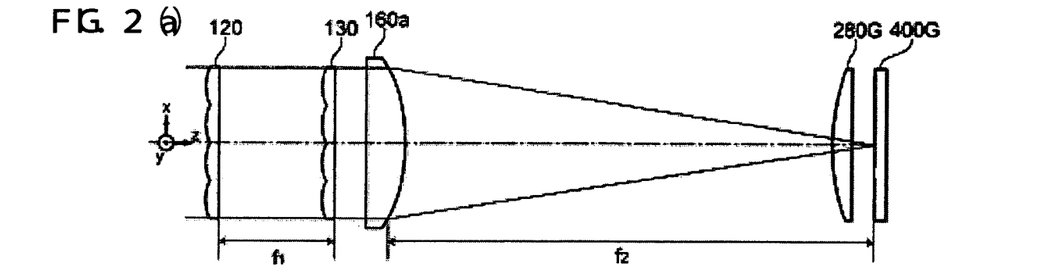
FIG. 2A is diagram of optical lengths of a first lens array and a superposing lens in a projector 1000a of a comparative example.
FIG. 2B is a diagram of optical length of a superposing lens in the projector 1000a of the comparative example.
FIG. 2C is a diagram of optical length of a superimposing lens in the projector 1000 according to the first exemplary embodiment.

FIGS. 2A through 2C show schematic explaining advantages of the projector 1000 in the first exemplary embodiment. FIG. 2A shows the relationship between the focal length of the first lens array 120 and the focal length of a superposing lens 160a included in a projector 1000a according to a comparison example. FIG. 2B shows the focal length of the superposing lens 160a included in the projector 1000a according to the comparison example. FIG. 2C shows the focal length of the superposing optical system 150 included in the projector 1000 according to the first exemplary embodiment. For the sake of simplification of the explanation, the optical path of the green light in the red, green and blue lights is shown in FIGS. 2A through 2C. The field lens 280G and the electro-optical modulation device 400G disposed in the optical path of the green light are shown in these figures, but the second dichroic mirror 220 is not shown therein.

As described above, the projector 1000 in the first exemplary embodiment includes the superposing optical system 150 which has the first superposing lens 160 and the second superposing lens 170. The first superposing lens 160 is interposed between the second lens array 130 and the color-separating and guiding optical system 200. The second superposing lens 170 is contained within the color-separating and guiding optical system 200. The second superposing lens 170 is the first convex lens 172 and the second convex lens 174.

On the other hand, the projector 1000a (not shown) in the comparison example does not have the superposing optical system 150 included in the projector 1000 in the first exemplary embodiment, but has only the superposing lens 160a after the second lens array 130. In other words, if the superposing optical system 150 in the projector 1000 in the first exemplary embodiment comprises only the first superposing lens 160, the superposing optical system 150 is the same as the superposing lens 160a in the projector 1000a of the comparison example.

In the projector 1000a according to the comparison example, the focal length $f_2$ of the superposing lens 160a is comparatively large as shown in FIGS. 2A and 2B. However, in the projector 1000 according to the first exemplary embodiment, the focal length $f_3$ of the superposing optical system 150 can be reduced by the operation of the first convex lens 172 as illustrated in FIG. 2C.

More specifically, in the projector 1000 according to the first embodiment, since the focal length $f_3$ of the superposing optical system 150 is made smaller than that in the related-art projector without varying the focal length $f_1$ of the second small lenses 131 while securing the length of the optical path in the color-separating and guiding optical system 200, the ratio of the focal length $f_3$ of the superposing optical system 150 to the focal length $f_1$ of the second small lenses 131 (i.e., the enlargement rate) can be decreased. As described above, since the size of the regions to be illuminated is calculated by multiplying the size of the first small lens 121 by the ratio of $f_3/f_1$ (enlargement rate, $f_1$: focal length of the second small lenses 131, $f_3$: focal length of the superposing optical system 150), the ratio of the size of the regions to be illuminated to the size of the first small lenses 121 can be reduced without decreasing the size of the light source device 110 and the color-separating and guiding optical system 200. Accordingly, small-sized electro-optical modulation devices can be used in the projector, which easily reduces the cost of the projector.

As described above, in the projector 1000 according to the first exemplary embodiment, the focal length $f_3$ of the superposing optical system 150 is reduced. As a result, the focal length $f_1$ of the second small lenses 131 (and the first small lenses 121) can be decreased when electro-optical modulation devices smaller than the electro-optical modulation devices of the related-art projector are used as well as when electro-optical modulation devices of the same size as that of the electro-optical modulation devices of the related-art projector are used. Accordingly, the distance between the first lens array 120 and the second lens array 130 can be reduced and thus the projector can be made compact.

In the projector 1000 according to the first exemplary embodiment, the color-separating and guiding optical system 200 includes the first dichroic mirror 210 and the second dichroic mirror 220. The projector 1000 according to the first exemplary embodiment has the first through and third electro-optical modulation devices 400R, 400G and 400B, and the first convex lens 172 and the second convex lens 174 as the second superposing lens 170.

In the projector 1000 according to the first exemplary embodiment, since relatively wide spaces are given to the first convex lens 172 and the second convex lens 174, the color-separating and guiding optical system 200 need not be large-sized. Accordingly, the focal length of the superposing optical system 150 can be effectively reduced and thus the enlargement rate can be lowered.

In the projector 1000 according to the first exemplary embodiment, the first convex lens 172 and the second convex lens 174 have the same focal length.

Therefore, in the projector 1000 according to the first exemplary embodiment, the same convex lens can be used as the first convex lens 172 and the second convex lens 174 and thus the manufacturing cost of the projector can be lowered.

In the projector 1000 according to the first exemplary embodiment, the light source device 110 includes the ellipsoidal reflector 114, the light emission tube 112 having the light emission center in the vicinity of the first focus of the ellipsoidal reflector 114, and the collimating lens 118 for converting the light reflected and converged by the ellipsoidal reflector 114 into substantially parallel light.

In the projector 1000 according to the first exemplary embodiment, since the size of the collimated light which is emitted from the light source device 110 is smaller than the size of the ellipsoidal reflector 114, the projector can be made compact.

In the projector 1000 according to the first exemplary embodiment, the auxiliary mirror 116 as reflection means for reflecting light, which is emitted from the light emission tube 112 toward the illumination target side, to the ellipsoidal reflector 114 is provided on the light emission tube 112.

In the projector 1000 according to the first exemplary embodiment, therefore, since the light emitted from the light emission tube 112 toward the illumination target side is reflected to the ellipsoidal reflector 114, the ellipsoidal reflector 114 need not be so sized as to cover the ends of the light emission tube 112 on the illumination target side. Accordingly, the size of the ellipsoidal reflector can be reduced and thus the projector can be made compact.

In the projector 1000 according to the first exemplary embodiment, the polarization conversion element 140 for converting the illumination lights coming from the light source device 110 into one type linear polarized lights and emitting the converted lights is interposed between the second lens array 130 and the first superposing lens 160.

Therefore, the projector 1000 in the first exemplary embodiment can be suitably used especially as a projector including electro-optical modulation devices using liquid crystal panels.

Second Exemplary Embodiment

Figure 3:
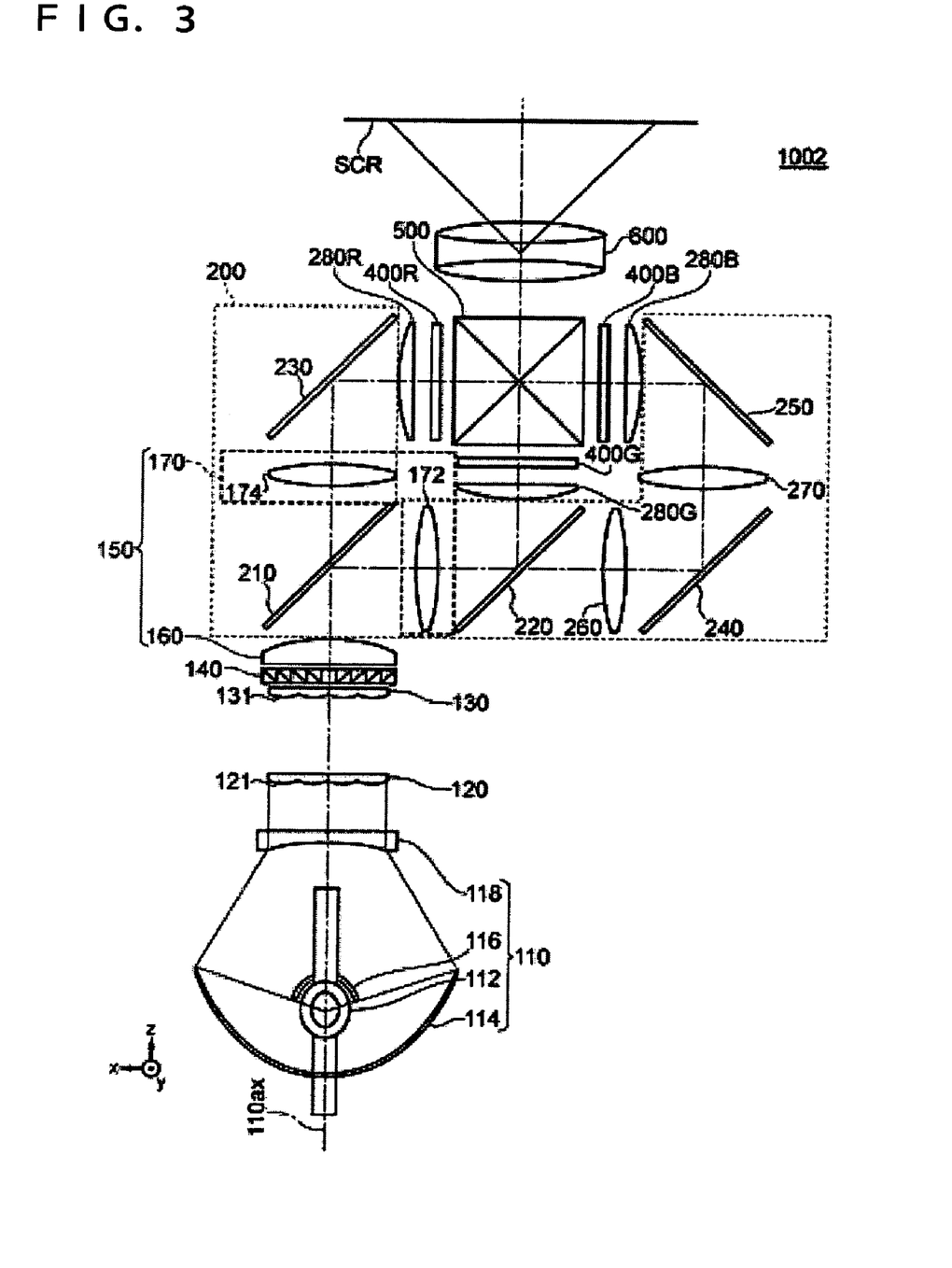
FIG. 3 is a diagram of an optical system of a projector 1002 according to a second exemplary embodiment.

FIG. 3 shows an optical system of a projector 1002 in a second exemplary embodiment. As shown in FIG. 3, the projector 1002 in the second exemplary embodiment basically has a similar structure as that of the projector 1000 in the first exemplary embodiment except that the positional relationship of the components from the light source device 110 to the first superposing lens 160 with respect to the color-separating and guiding optical system 200 are different from those in the projector 1000 in the first exemplary embodiment.

In the projector 1002 according to the second exemplary embodiment, while the positions of the components from the light source device 110 to the first superposing lens 160 with respect to the color-separating and guiding optical system 200 in the second exemplary embodiment are different from those in the projector 1000 in the first exemplary embodiment, the focal length of the superposing optical system 150 can be made smaller than that of the related-art projector without varying the focal length of the second small lenses 131 while securing the length of the optical path in the color-separating and guiding optical system 200 similarly to the structure of the projector 1000 in the first exemplary embodiment. As a result, ratio of the size of the regions to be illuminated to the size of the first small lenses 121 can be reduced without miniaturizing the light source device 110 and the color-separating and guiding optical system 200. Accordingly, the small-sized electro-optical modulation devices can be used and thus the cost of the projector can be easily lowered.

As described above, since the focal length of the superposing optical system 150 can be decreased in the projector 1002 according to the second exemplary embodiment, the focal length of the second small lenses 131 (and the first small lenses 121) can be decreased when electro-optical modulation devices smaller than the electro-optical modulation device of the related-art projector are used as well as when electro-optical modulation devices of the same size as that of the electro-optical modulation devices of the related-art projector are used. Accordingly, the distance between the first lens array 120 and the second lens array 130 can be decreased and thus the projector can be made compact.

Third Exemplary Embodiment

Figure 4:
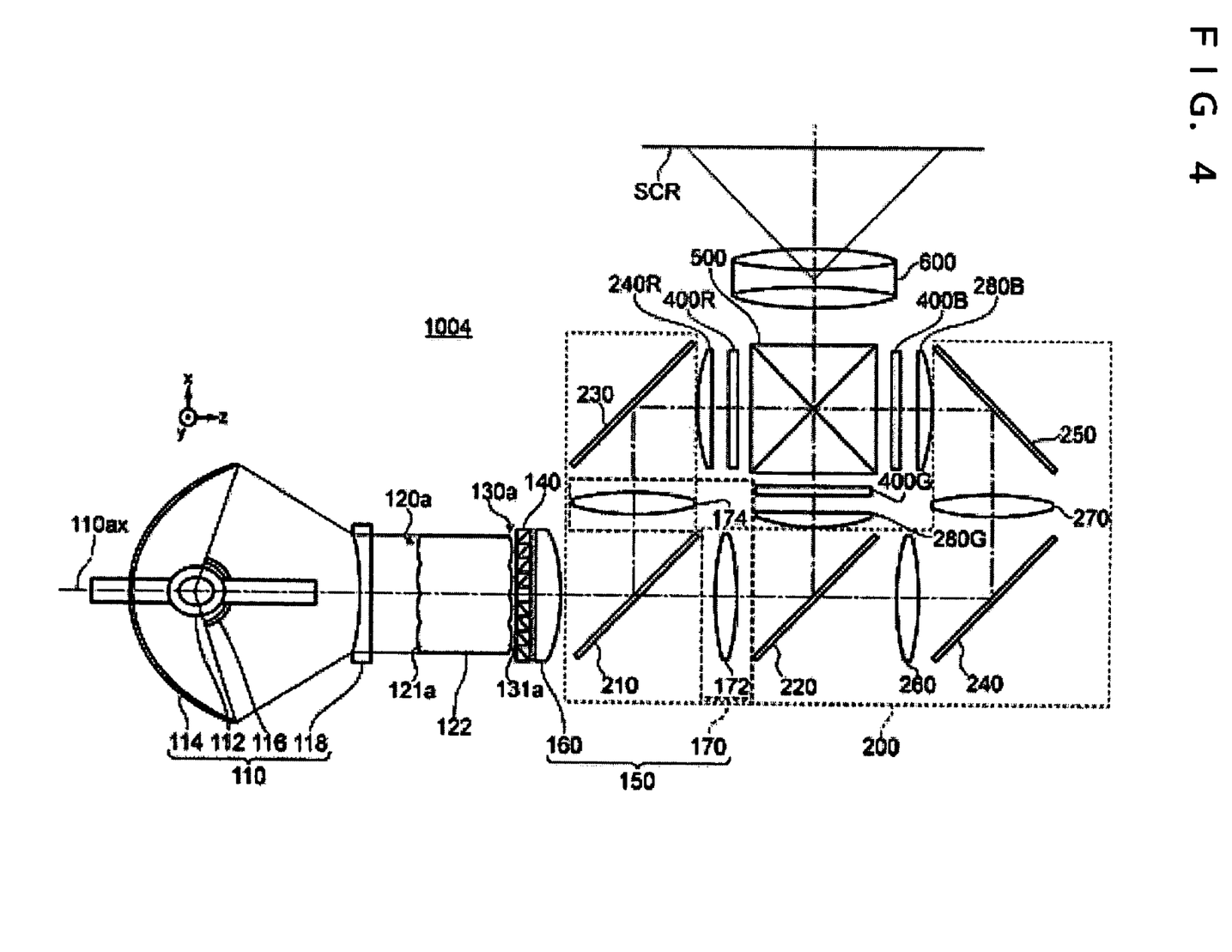
FIG. 4 is a diagram of an optical system of a projector 1004 according to a third exemplary embodiment.

FIG. 4 shows an optical system of a projector 1004 in a third exemplary embodiment. As shown in FIG. 4, the projector 1004 in the third exemplary embodiment basically has a similar structure as that of the projector 1000 in the first exemplary embodiment except that the structures of the first lens array and the second lens array are different from those in the projector 1000 in the first exemplary embodiment. More specifically, in the projector 1004 according to the third exemplary embodiment, a lens array unit 122 having one-piece first and second lens arrays 120a and 130a is used as shown in FIG. 4.

The lens array unit 122 having the one-piece first and second lens arrays 120a and 130a is usually formed by press-molded glass. In this case, the thickness of the lens array unit 122 increases when the distance between the first lens array 120a and the second lens array 130a is large. As a result, breaking or chipping may be caused during manufacture. Additionally, when the thickness of the lens array unit 122 is large, the weight of the lens array unit 122 increases and the material cost rises.

On the other hand, in the projector 1004 according to the third exemplary embodiment, since the focal length of the superposing optical system 150 is reduced similarly to the projector 1000 in the first exemplary embodiment, the focal length of the second small lenses 131a (and the first small lenses 120a) can be decreased when electro-optical modulation devices smaller than the electro-optical modulation devices of the related-art projector are used as well as when electro-optical modulation devices of the same size as that of the electro-optical modulation devices of the related-art projector are used. As a result, the distance between the first lens array 120a and the second lens array 130a can be decreased, and thus the thin lens array unit 122 having the one-piece first and second lens arrays 120a and 130a can be easily manufactured. Additionally, since the thin lens array unit 122 is used in the projector 1004, the weight of the lens array unit 122 can be reduced and thus the material cost can be lowered while the projector 1004 can be made compact. Furthermore, alignment of the first and second lens arrays 120a and 130a is not required in positioning the respective optical components, and deterioration of the positional accuracy of the first and second lens arrays 120a and 130a can be prevented after disposition of the respective optical components.

Fourth Exemplary Embodiment

Figure 5:
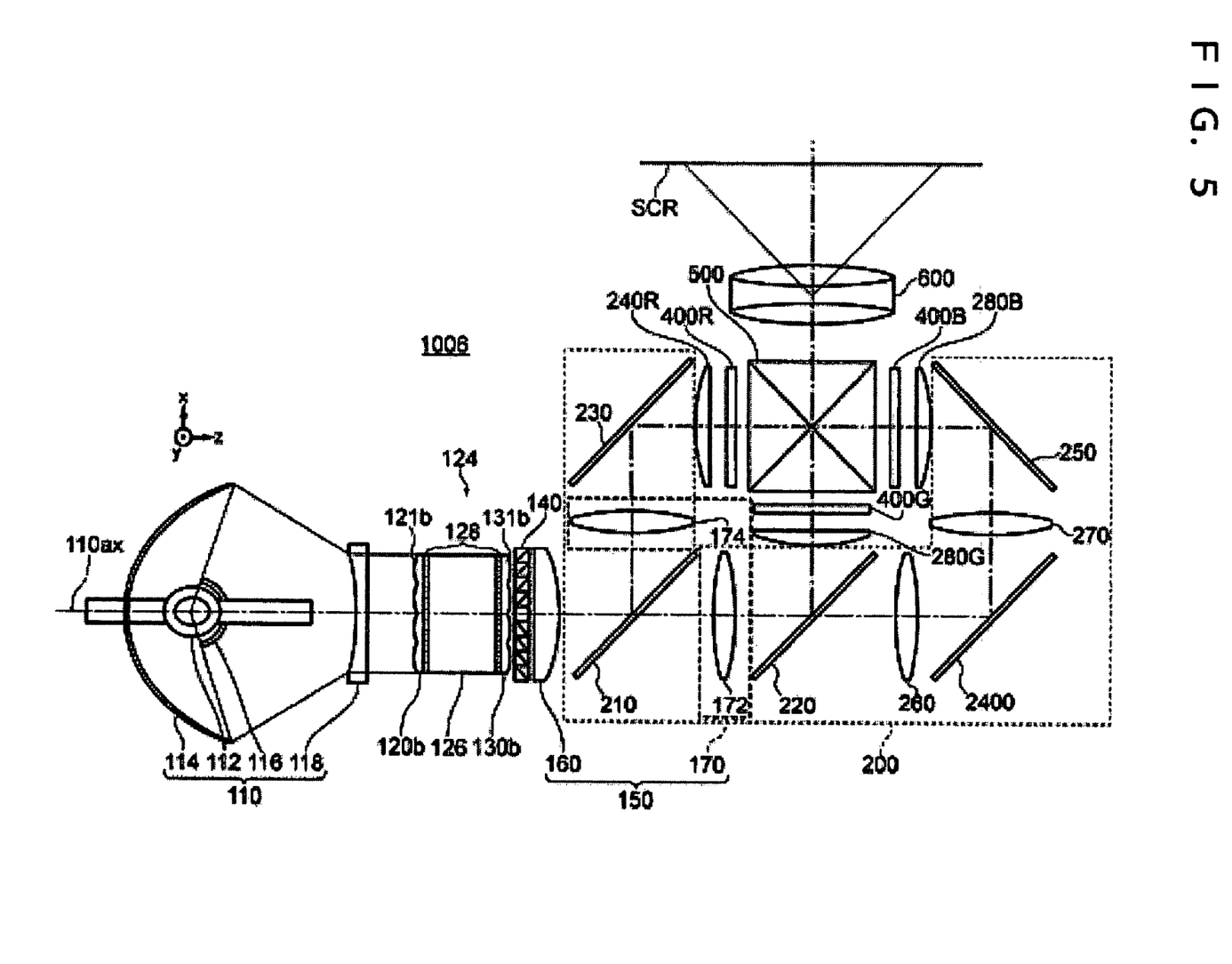
FIG. 5 is a diagram of an optical system of a projector 1006 according to a fourth exemplary embodiment.

FIG. 5 shows an optical system of a projector 1006 in a fourth exemplary embodiment. As shown in FIG. 5, the projector 1006 in the fourth exemplary embodiment basically has a similar structure as that of the projector 1000 in the first exemplary embodiment except that the structures of the first lens array and the second lens array are different from those in the projector 1000 in the first exemplary embodiment. More specifically, the projector 1006 in the fourth exemplary embodiment includes a lens array unit 124 which has a light-transmissive member 126 as shown in FIG. 5. The light-transmissive member 126 is interposed between a first lens array 120b and a second lens array 130b and guides lights coming from the first lens array 120b to the second lens array 130b. The first lens array 120b and the second lens array 130b of the lens array unit 124 are connected to each other via the light-transmissive member 126.

For making the projector compact, there is a demand for decreasing the thickness of the light-transmissive member 126, through which the first lens array 120b and the second lens array 130b are connected to form the lens array unit 124, so that reduction in the weight of the lens array unit 124 and lowering of the material cost can be attained.

In the projector 1006 according to the fourth exemplary embodiment, the focal length of the superposing optical system 150 is reduced similarly to the first exemplary embodiment. As a result, the focal length of the second small lenses 131b (and the first small lenses 121b) can be decreased when electro-optical modulation devices smaller than the electro-optical modulation devices of the related-art projector are used as well as when electro-optical modulation devices of the same size as that of the electro-optical modulation devices of the related-art projector are used. Accordingly, the distance between the first lens array 120b and the second lens array 130b can be decreased and thus the lens array unit 124 having the thin light-transmissive member 126 can be easily manufactured. Since the thin lens array unit 124 is used in the projector 1006, the weight of the lens array unit 124 can be reduced and the material cost can be lowered while the projector 1006 can be made compact.

When the first lens array 120*b* and the second lens array 130*b* aligned with each other in advance are connected to the light-transmissive member 126, positional adjustment of the lens array unit 124 having the first and second lens arrays 120*b* and 130*b* with respect to other optical components is only required for the disposition of the respective optical components. Accordingly, the positioning of the respective optical components including the lens array unit 124 can be facilitated and deterioration of the positional accuracy of the first and second lens arrays 120*b* and 130*b* after disposition of the respective optical components can be prevented.

In the projector 1006 according to the forth exemplary embodiment, the light-transmissive member 126 is formed by the same base material as those of the first and second lens arrays 120*b* and 130*b*. More specifically, in the projector 1006 according to the fourth exemplary embodiment, the light-transmissive member 126 has a refractive index equal to those of the first and second lens arrays 120*b* and 130*b*. Also, adhesive 128 for connecting the first lens array 120*b* to the light-transmissive member 126 and the light-transmissive member 126 to the second lens array 130*b* has a refractive index substantially equal to those of the first and second lens arrays 120*b* and 130*b*.

In the projector 1006 according to the fourth exemplary embodiment, therefore, reflection of light and the like at the boundaries between the first lens array 120*b* and the light-transmissive member 126 and between the second lens array 130*b* and the light-transmissive member 126 can be further prevented. As a result, loss of light quantity due to such undesirable reflection and the like can be further reduced.

In the projector 1006 according to the fourth exemplary embodiment, the light-transmissive member 126 has a linear expansion coefficient equal to those of the first and second lens arrays 120*b* and 130*b*.

In the projector 1006 according to the fourth exemplary embodiment, therefore, thermal stress due to variations in temperature caused by the use of the projector is prevented. As a result, damage to the joints between the first lens array 120*b* and the light-transmissive member 126 and between the second lens array 130*b* and the light-transmissive member 126 can reduce or be eliminated.

Fifth Exemplary Embodiment

Figure 6:
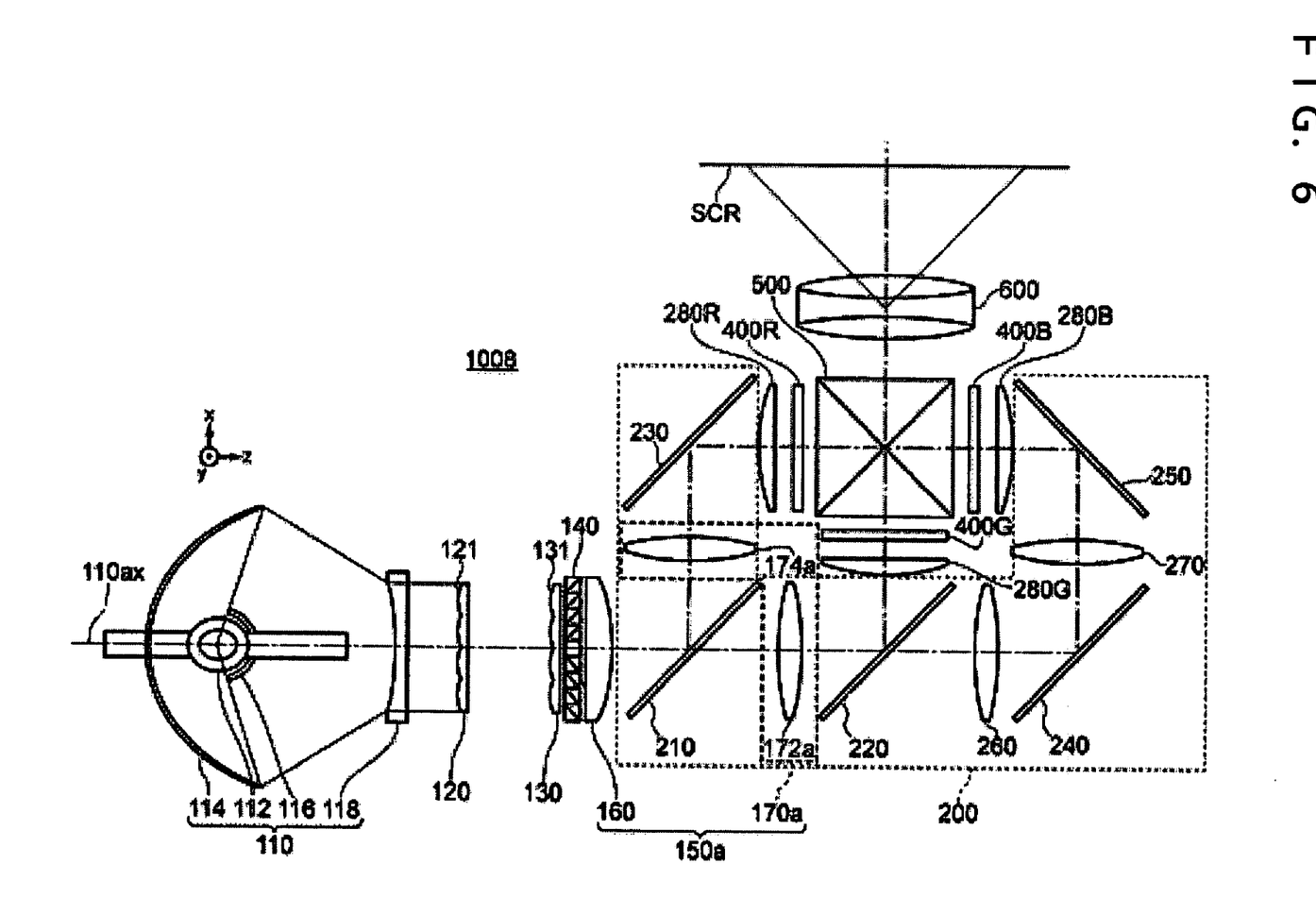
FIG. 6 is a diagram of an optical system of a projector 1008 according to a fifth embodiment.

FIG. 6 shows an optical system of a projector 1008 according to a fifth exemplary embodiment. As shown in FIG. 6, the projector 1008 in the fifth exemplary embodiment basically has a similar structure as that of the projector 1000 in the first exemplary embodiment except that the structure of the superposing optical system is different from that in the projector 1000 in the first exemplary embodiment. More specifically, while the first convex lens 172 and the second convex lens 174 of the superposing optical system 150 have the same focal length in the projector 1000 according to the first exemplary embodiment, a first convex lens 172*a* and a second convex lens 174*a* of a superposing optical system 150*a* have different focal lengths in the projector 1008 according to the fifth exemplary embodiment. The radius of curvature of the second convex lens 174*a* disposed in the optical path along which light having a relatively longer wavelength (i.e., red light) passes is smaller than the radius of curvature of the first convex lens 172*a* disposed in the optical path along which light having a relatively shorter wavelength (i.e., green and blue lights) passes.

Generally, a refractive index of a lens has a characteristic of wavelength dispersion, and the refractive index of light having a relatively longer wavelength is smaller than the refractive index of light having a relatively shorter wavelength. Thus, light having a relatively longer wavelength is more difficult to reflect than light having a relatively shorter wavelength. As a result, when the radii of curvature of the first and second convex lenses 172*a* and 174*a* are set to the same value, the size of the region illuminated by the light having a relatively longer wavelength differs from the size of the region illuminated by the light having a relatively shorter wavelength. However, in the projector 1008 according to the fifth exemplary embodiment, the red light passes through the second convex lens 174*a* having a small radius of curvature so that the difficulty in reflection of the red light can be compensated. Thus, the size of the region illuminated by the light having a relatively longer wavelength (i.e., red light) becomes equal to the size of the region illuminated by the light having a relatively shorter wavelength (i.e., green light). In addition, the size of the region illuminated by the blue light can be equal to the size of those of other color light by adjust at least one of radii of curvature of relay lenses 260 and 270 and a field lens 280B. Accordingly, since the electro-optical modulation devices 400R, 400G and 400B corresponding to the respective light colors obtain the illuminated regions of the same size, illumination conditions of the lights in respective colors are equalized. As a result, unevenness of colors can be reduced and the color reproducibility can be enhanced.

It should be stated that the projector according to the invention is not limited to the exemplary embodiments described and depicted. In light of the above teachings, it is therefore understood that within the scope of the appended claims, the invention may be practiced otherwise than as specifically described herein. For example, the following modifications may be made.

While the red light passes through the second convex lenses 174 and 174*a* in the projectors 1000 through 1008 in the above exemplary embodiments, the blue light may pass through the second convex lenses 174 and 174*a*. In this case, the radius of curvature of the first convex lens 172*a* is smaller than the radius of curvature of the second convex lens 174*a*, because the second convex lens 174*a* is disposed in the optical path along which light having a relatively shorter wavelength (i.e., blue light) passes and the convex lens 172*a* is disposed in the optical path along which light having a relatively longer wavelength (i.e., red and green light) passes.

While the projectors 1000 through 1008 in the above exemplary embodiments are transmissive-type projectors, the invention is applicable to a reflection-type projector. The "transmissive-type" herein refers to the type which includes electro-optical modulation devices as light modulation devices capable of transmitting light such as transmissive-type electro-optical modulation devices. The "reflection-type" refers to the type which includes electro-optical modulation devices as light modulation devices capable of reflecting light such as reflection-type electro-optical modulation devices. When the invention is applied to the reflection-type projector, advantages similar to those of the transmissive-type projector can be offered.

In the projectors 1000 through 1008 according to the above exemplary embodiments, the electro-optical modulation devices using the liquid crystal panels are employed. However, other electro-optical modulation devices such as micro-mirror type light modulation devices may be used as long as the electro-optical modulation devices can modulate entering light in accordance with image information. For example, DMD (digital micro-mirror device, trademark of Texas Instruments CO.) may be used as the micro-mirror type light modulation devices.

In the projectors 1000 through 1008 according to the above exemplary embodiments, the light source device 110 includes the ellipsoidal reflector 114, the light emission tube 112 having the light emission center in the vicinity of the first focus of the ellipsoidal reflector 114, and the collimating lens 118 for converting light reflected and converged by the ellipsoidal reflector 114 into substantially parallel light. However, a light source device including a parabolic reflector and a light emission tube having the light emission center in the vicinity of the focus of the parabolic reflector can be appropriately used.

Obviously, the invention is applicable to a front-projection-type projector which projects projection images from the audience side and to a rear-projection-type projector which projects projection images from the side opposite to the audience side.

Further, while this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention. The priority applications Numbers JP2004-356416 upon which this patent application is based is hereby incorporated by reference.

What is claimed is:

1. A projector, comprising:
   a light source device that emits substantially parallel illumination light;
   a first lens array having a plurality of first small lenses each of which divides the illumination light coming from the light source device into a plurality of partial light fluxes;
   a second lens array having a plurality of second small lenses corresponding to the first small lenses;
   a superposing optical system that superposes the partial light fluxes coming from the second lens array on regions to be illuminated;
   a color-separating and guiding optical system that separates the lights coming from the second lens array into lights in a plurality of different colors and guides the separated lights to the regions to be illuminated;
   a plurality of electro-optical modulation devices each of which modulates the light in the corresponding color of the lights in the plural colors separated by the color-separating and guiding optical system in accordance with image information;
   a color synthesizing optical system that synthesizes the lights in the respective colors modulated by the plural electro-optical modulation devices; and
   a projecting optical system that projects image light synthesized by the color synthesizing optical system, wherein:
   the superposing optical system has a first superposing lens disposed between the second lens array and the color-separating and guiding optical system and a second superposing lens having a convex lens included in the color-separating and guiding optical system;
   the color-separating and guiding optical system including a first dichroic mirror that separates a first color light from second and third color lights in the light coming from the second lens array and a second dichroic mirror that separates the second color light from the third color light in the light coming from the first dichroic mirror;
   first through third electro-optical modulation devices provided as the plural electro-optical modulation devices, the first through third electro-optical modulation devices modulate the respective first through third color lights; and
   a first convex lens and a second convex lens provided as the second superposing lens, the first convex lens being disposed between the first dichroic mirror and the second dichroic mirror and the second convex lens being disposed between the first dichroic mirror and the first electro-optical modulation device,
   wherein a first polarization plate is interposed between the color separating and guiding optical system and each of the electro-optical modulation devices and a second polarization plate is interposed between each of the electro-optical modulation devices and the color synthesizing optical system such that the first polarization elate and second polarization plate are provided at opposing sides of each of the electro-optical devices.

2. A projector according to claim 1, the first and second convex lenses having the same focal length.

3. A projector according to claim 1,
   the radius of curvature of either the first convex lens or the second convex lens disposed in an optical path along which a color light having a relatively long wavelength passes being smaller than the radius of curvature of the other convex lens disposed in an optical path along which a color light having a relatively short wavelength passes.

4. A projector according to claim 1, wherein the first lens array and the second lens array being formed as one-piece component.

5. A projector according to claim 1, further comprising:
   a light-transmissive member that guides the light coming from the first lens array to the second lens array, the light-transmissive member being interposed between the first lens array and the second lens array and connecting the first and second lens arrays.

6. A projector according to claim 5,
   the light-transmissive member having a refractive index substantially equal to those of the first and second lens arrays.

7. A projector according to claim 5, further comprising:
   adhesive that connects the first lens array to the light-transmissive member and the light-transmissive member to the second lens array, the adhesive having a refractive index substantially equal to those of the first and second lens arrays.

8. A projector according to claim 5,
   the light-transmissive member having a linear expansion coefficient equal to those of the first and second lens arrays.

9. A projector according to claim 5,
   the light-transmissive member being formed by the same base material as those of the first and second lens arrays.

10. A projector according to claim 1,
    the light source device including an ellipsoidal reflector, a light emission tube having a light emission center in the vicinity of a first focus of the ellipsoidal reflector, and a collimating lens that converts light reflected and converged by the ellipsoidal reflector into substantially parallel light.

11. A projector according to claim 10,
    the light emission tube having a reflector for reflecting light, which is emitted from the light emission tube toward the illumination target side, to the light emission tube.

12. A projector according to claim 1, further comprising:
    a polarization conversion element that converts the illumination light coming from the light source device into one-type linear polarized light and emits the converted light, the polarization conversion element being interposed between the second lens array and the first superposing lens.

* * * * *